Figure 1:
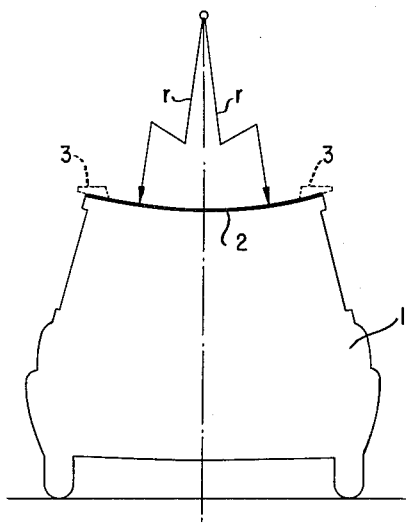

July 27, 1965  K. WILFERT ETAL  3,197,252
ROOF CONSTRUCTION FOR VEHICLES
Filed May 7, 1962

INVENTORS.
KARL WILFERT
BELA BARENYI
BY
*Dicke + Craig*
ATTORNEYS.

United States Patent Office 3,197,252
Patented July 27, 1965

3,197,252
ROOF CONSTRUCTION FOR VEHICLES
Karl Wilfert, Stuttgart-Degerloch, and Béla Barényi, Stuttgart-Vaihingen, Germany, assignors to Daimler-Benz Aktiengesellschaft, Stuttgart-Unterturkheim, Germany
Filed May 7, 1962, Ser. No. 192,787
Claims priority, application Germany, May 17, 1961, D 36,101
4 Claims. (Cl. 296—137)

The present invention relates to a motor vehicle, particularly to a passenger motor vehicle provided with a substantially flat load-carrying roof preferably with a roof adapted to be loaded directly, and essentially consists in the fact that the roof surface is curved concavely in the transverse cross section thereof and convexly in the longitudinal cross section thereof.

By reason of the concave curvature of the roof surface, concave as viewed in the transverse cross section, there is achieved a particularly high loading capacity on the part of the roof because the roof panel such as a sheet metal member forming the roof surface is loaded or stressed in tension by the load placed thereon. However, the rigidity or strength in tensional stresses of even relatively thin sheet metal members or panels is completely adequate in order to transport such heavy loads on the roof of the motor vehicle as permits the load or carrying capacity of the vehicle itself.

However, with a purely concave curvature of the roof surface, the rain water would collect in the center of the roof surface so that care must also be taken for a good drainage of the rain water. The problem resulting therefrom is solved in accordance with the present invention by curving the roof of the present invention in a convex manner as viewed in longitudinal cross section. The rain water may now flow off in a completely satisfactory manner toward the front and the rear from the roof. Usual rain gutters or drainage channels above the doors become unnecessary by the construction of the motor vehicle in accordance with the present invention and there also no longer exists any danger that the passengers are molested during egress from and ingress into the vehicle by water dripping down laterally from the roof of the vehicle.

According to a further feature of the present invention, the concave and/or the convex roof curvature may have a constant radius of curvature. This is particularly advantageous for the manufacture of the roof panels because the dies for the roof surface can be manufactured essentially on vertical lathes. The radius of curvature of the convex roof curvature may thereby appropriately amount approximately to three times the radius of curvature of the concave roof curvature.

For purposes of increasing the carrying capacity or load capacity of the roof, the latter may additionally be provided at the longitudinal and/or cross rim portions thereof with rim reinforcements possibly extending over and/or above the roof surface.

Accordingly, it is an object of the present invention to provide a motor vehicle and particularly a roof structure for a passenger motor vehicle which effectively and by simple means eliminates the drawbacks of the prior art constructions.

It is another object of the present invention to provide a motor vehicle roof construction in which a particularly high load capacity of the roof is achieved by so arranging and constructing the roof as to subject the sheet metal members thereof to tensional stresses under the load placed thereon.

Still another object of the present invention resides in the provision of a substantially flat roof for a motor vehicle adapted to directly support thereon the load and which is so curved both in the transverse and longitudinal directions thereof as to provide completely adequate drainage of any moisture such as rain water collecting thereon.

A further object of the present invention resides in the provision of a substantially flat load-carrying roof for motor vehicles for which the dies used in the manufacture of the roof panels may be readily machined.

Figure 2:
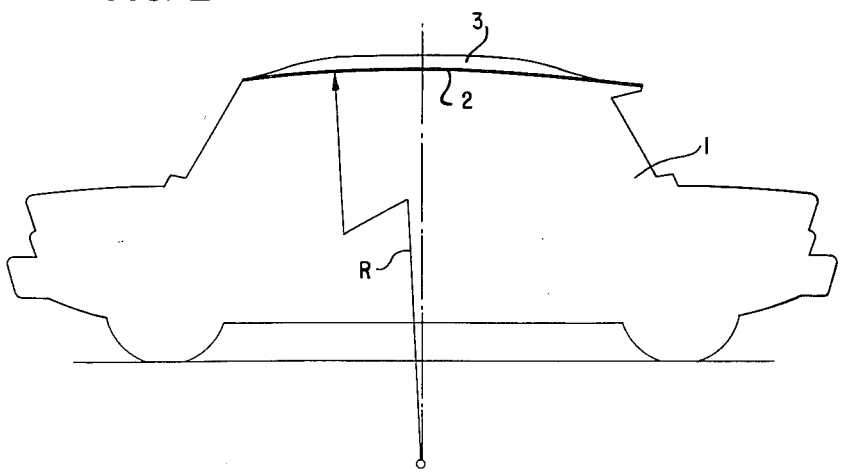

These and other objects, features and advantages of the present invention will become more obvious from the following description when taken in connection with the accompanying drawing which shows, for purposes of illustration only, one embodiment in accordance with the present invention, and wherein:

FIGURE 1 is a schematic transverse cross sectional view through a passenger motor vehicle provided with a roof in accordance with the present invention, and FIGURE 2 is a schematic longitudinal cross sectional view through the passenger motor vehicle illustrated in FIGURE 1.

Referring now to the drawing wherein like reference numerals are used throughout the two views to designate corresponding parts, reference numeral 1 designates therein a passenger motor vehicle of any conventional construction which is illustrated schematically only for sake of simplicity. The passenger motor vehicle 1 is provided with a substantially flat roof 2. As shown in FIG. 1, the roof surface is curved concavely as viewed in transverse cross section. However, in contrast thereto, the roof surface is curved convexely in longitudinal cross section as shown in FIGURE 2. The contours of the roof recognizable in FIGURES 1 and 2 are each disposed along the arc of a corresponding circle having the radius r and R, respectively. Of course, the roof surface 2 need not necessarily have the contour of an arc of a circle with constant radii of curvature r and R as illustrated in the two figures but may also have any other suitable curved contour. However, constant radii of curvature are of advantage for manufacturing reasons as explained hereinabove.

For purposes of increasing the load-carrying capacity of the roof surface 2, it may also be appropriate in accordance with the present invention to provide rim reinforcements along the rim portions of the roof. In FIGURE 1, such rim reinforcements are designated by reference numeral 3 which extend beyond and above the roof surface 2. Also, in FIGURE 2, such rim reinforcements 3 may be readily recognized.

While we have shown and described one embodiment in accordance with the present invention, it is understood that the same is not limited thereto, but is susceptible of many changes and modifications within the spirit and scope thereof, as known to a person skilled in the art; for example, the roof may be made of any suitable material appropriately secured in any conventional manner to the top of the vehicle passenger compartment. Consequently, we do not wish to be limited to the details shown and described herein, but intend to cover all such changes and modifications as are encompassed by the scope of the appended claims.

We claim:
1. A motor vehicle, especially passenger motor vehicle having in appearance a substantially flat sheet metal roof, the roof surface of said roof being curved concavely as seen in transverse cross section and convexly in longitudinal cross section, with the radius of curvature for each curve being relatively large to provide said substantially flat appearance of said roof.

2. A motor vehicle, especially passenger motor vehicle having a substantially flat sheet metal roof adapted to be loaded directly, the roof surface of said roof being curved concavely as seen in transverse cross section and convexly in longitudinal cross section, at least one of the concave and convex curvatures having a constant radius of curvature and the radius of curvature for each curve being relatively large to provide said substantially flat roof.

3. A motor vehicle, especially passenger motor vehicle having a substantially flat sheet metal roof panel adapted to be loaded directly, the roof surface of said roof being curved concavely as seen in transverse cross section and convexly in longitudinal cross section, and at least one of the concave and convex curvatures having a constant radius of curvature with the radius of curvature of the convex curvature being about three times the radius of curvature of the concave curvature, each of said radius of curvatures being relatively large to provide a substantially flat roof.

4. A motor vehicle, especially passenger motor vehicle having an approximately flat sheet metal roof panel adapted to be loaded directly, the roof surface of said roof being curved concavely as seen in transverse cross section and convexly in longitudinal cross section, and at least one of the concave and convex curvatures having a constant radius of curvature with the radius of curvature of the convex curvature being about three times the radius of curvature of the concave curvature, each of said radii of curvature being relatively large to provide said approximately flat roof, and rim reinforcing means provided at least at some of the longitudinal and transverse rim portions thereof.

References Cited by the Examiner

UNITED STATES PATENTS

| | | | |
|---|---|---|---|
| 2,256,837 | 9/41 | Trautvetter | 296—137 |
| 2,991,121 | 7/61 | Barenyi | 296—137 |

FOREIGN PATENTS 815,194   6/59   Great Britain.

OTHER REFERENCES

Civil Engineering, December 1961, page 58.

A. HARRY LEVY, *Primary Examiner.*
PHILIP ARNOLD, *Examiner.*